US009279447B2

(12) United States Patent
Nakagawa

(10) Patent No.: US 9,279,447 B2
(45) Date of Patent: Mar. 8, 2016

(54) BUSH BEARING

(71) Applicant: Oiles Corporation, Tokyo (JP)

(72) Inventor: Noboru Nakagawa, Kanagawa (JP)

(73) Assignee: Oiles Corporation, Tokyo (JP)

( * ) Notice: Subject to any disclaimer, the term of this patent is extended or adjusted under 35 U.S.C. 154(b) by 0 days.

(21) Appl. No.: 14/277,932

(22) Filed: May 15, 2014

(65) Prior Publication Data

US 2014/0248010 A1    Sep. 4, 2014

Related U.S. Application Data

(62) Division of application No. 13/936,644, filed on Jul. 8, 2013, now Pat. No. 8,834,030, which is a division of application No. 12/738,749, filed as application No. PCT/JP2008/002940 on Oct. 16, 2008, now Pat. No. 8,506,169.

(30) Foreign Application Priority Data

Oct. 18, 2007   (JP) ................................. 2007-271372

(51) Int. Cl.
*F16C 27/00*   (2006.01)
*F16C 33/02*   (2006.01)
(Continued)

(52) U.S. Cl.
CPC .............. *F16C 17/02* (2013.01); *B62D 5/0409* (2013.01); *F16C 27/063* (2013.01); *F16C 33/02* (2013.01);
(Continued)

(58) Field of Classification Search
CPC ........ F16C 17/02; F16C 27/063; F16C 33/02; B62D 5/0409; F16H 55/24; F16H 2057/0213; F16H 2057/0222; F16H 2057/126; F16H 57/021; F16H 1/16

USPC ......... 384/129, 215, 275, 276, 295–297, 299, 384/425, 428, 439–441, 464; 277/500, 585; 74/388 PS

See application file for complete search history.

(56) References Cited

U.S. PATENT DOCUMENTS

| 3,073,654 A | 1/1963 | Richey |
| 3,199,903 A | 8/1965 | Wood |

(Continued)

FOREIGN PATENT DOCUMENTS

| DE | 10 2005 048527 | 4/2007 |
| EP | 1 394 426 | 3/2004 |

(Continued)

OTHER PUBLICATIONS

International Search Report for PCT/JP2008/002940, mailed Dec. 16, 2008.

(Continued)

*Primary Examiner* — Adam D Rogers
(74) *Attorney, Agent, or Firm* — Nixon & Vanderhye P.C.

(57) ABSTRACT

A bush bearing includes a bearing body having an inner peripheral surface which is brought into contact with a cylindrical outer peripheral surface of a rotating shaft portion so as to be rotatable in a first direction, a groove provided on an outer peripheral surface of the bearing body so as to extend in the first direction, and an elastic ring fitted on said groove and having a pair of projecting portions and a portion, the pair of projecting portions partially projecting radially outward from the outer peripheral surface of said bearing body in second direction, the portion being provided at positions in the first direction between the pair of projecting portions, and not projecting radially outward from the outer peripheral surface of the bearing body.

1 Claim, 13 Drawing Sheets

(51) Int. Cl.

| | | |
|---|---|---|
| *F16C 35/00* | (2006.01) | |
| *F16C 17/02* | (2006.01) | |
| *B62D 5/04* | (2006.01) | |
| *F16C 27/06* | (2006.01) | |
| *F16H 55/24* | (2006.01) | |
| *F16H 57/021* | (2012.01) | |
| *F16H 1/16* | (2006.01) | |
| *F16H 57/022* | (2012.01) | |
| *F16H 57/12* | (2006.01) | |

(52) U.S. Cl.
CPC ............. *F16H 55/24* (2013.01); *F16H 57/021* (2013.01); *F16H 1/16* (2013.01); *F16H 2057/0213* (2013.01); *F16H 2057/0222* (2013.01); *F16H 2057/126* (2013.01)

(56) References Cited

U.S. PATENT DOCUMENTS

| | | | |
|---|---|---|---|
| 5,531,524 A | | 7/1996 | Brouwer |
| 5,601,370 A | | 2/1997 | Shibayama et al. |
| 7,220,056 B2 | | 5/2007 | Kubota et al. |
| 7,665,747 B2 | | 2/2010 | Arlt |
| 7,798,504 B2 | | 9/2010 | Hirose et al. |
| 8,066,093 B2 | * | 11/2011 | Kondo ................ B62D 5/0409 180/443 |
| 8,272,785 B2 | | 9/2012 | Hirose et al. |
| 8,418,583 B2 | | 4/2013 | Oki et al. |
| 8,506,169 B2 | | 8/2013 | Nakagawa |
| 8,568,114 B2 | | 10/2013 | Masuda et al. |
| 8,696,207 B2 | * | 4/2014 | Tange ................... F16C 27/063 384/215 |
| 2004/0042693 A1 | | 3/2004 | Dubreuil |
| 2004/0076353 A1 | | 4/2004 | Kubota et al. |
| 2010/0239199 A1 | | 9/2010 | Nakagawa |
| 2015/0204381 A1 | * | 7/2015 | Zaike ................... F16H 27/063 384/202 |

FOREIGN PATENT DOCUMENTS

| | | |
|---|---|---|
| JP | 2001-146169 | 5/2001 |
| JP | 2001-322554 | 11/2001 |
| JP | 2002-096749 | 4/2002 |
| JP | 2004-183780 | 7/2004 |
| JP | 2004-255988 A | 9/2004 |
| JP | 2004-347105 | 12/2004 |
| JP | 2005-104366 | 4/2005 |
| JP | 2005-161894 | 6/2005 |
| JP | 2006-027368 | 2/2006 |
| JP | 2006-044430 | 2/2006 |
| JP | 2006-044449 | 2/2006 |

OTHER PUBLICATIONS

Microfilm of the spec and dwgs annexed to the request of JP Utility Model Application No. 103198/1984 (Laid-Open No. 019131/1986), Japan Servo Co., Ltd., Feb. 4, 1986.

Extended European Search Report dated Nov. 28, 2012, issued in corresponding EP Application No. 08839561.1-2424, 3 pages.

Parent; U.S. Appl. No. 13/936,644, filed Jul. 8, 2013, Nakagawa.

* cited by examiner

BUSH BEARING

CROSS REFERENCE TO RELATED APPLICATION

This application is a divisional of U.S. application Ser. No. 13/936,644, filed Jul. 8, 2013, now allowed, which is a divisional of U.S. application Ser. No. 12/738,749, filed Apr. 19, 2010, now U.S. Pat. No. 8,506,169, which claims priority to Japanese Application No. 2007-271372, filed Oct. 18, 2007, each incorporated herein by reference in its entirety.

TECHNICAL FIELD

The present invention relates to a bush bearing, and more particularly to a bush bearing for rotatably supporting a rotating shaft portion of an end portion of a driving gear which meshes via a meshing portion with a driven gear of a transmission for transmitting the power of an electric motor for steering assistance to a steering mechanism in an electric power steering.

BACKGROUND ART

Patent document 1: JP-A-2006-44430
Patent document 2: JP-A-2006-27368
Patent document 3: JP-A-2006-44449
Patent document 4: JP-A-2001-322554
Patent document 5: JP-A-2001-146169
Patent document 6: JP-A-2002-96749

In an electric power steering system for an automobile for assisting the steering operation, a speed reducer which consists of a worm shaft serving as a driving gear and a worm wheel serving as a driven gear meshing with the worm shaft is used for a transmission which transmits the power of an electric motor for steering assistance to a steering mechanism.

DISCLOSURE OF THE INVENTION

Problems to be Solved by the Invention

Incidentally, so-called backlash occurs in the meshing of the worm shaft and the worm wheel, and when an automobile travels on a rough road, for example, there are cases where tooth meshing noise (rattling noise) occurs between the worm shaft and the worm wheel due to backlash caused by an inverse input from the road surface.

Although techniques for preventing such tooth meshing noise (rattling noise) are variously proposed in the aforementioned documents, these techniques according to the proposals concern ball bearings which are relatively expensive and are heavyweight, and do not concern sliding bearings which are inexpensive and lightweight.

Moreover, with the techniques according to the proposals, since a rubber ring is merely interposed between an outer ring of a ball bearing and a housing accommodating a worm shaft, the slip off and permanent set of the rubber ring are likely to occur, with the result that these devices are difficult to withstand long-term use.

The present invention has been devised in view of the above-described aspects, and its object is to provide a bush bearing which is capable of maintaining its initial characteristics even in the long-term use and disusing the ball bearing, and which is inexpensive and lightweight.

Means for Solving the Problems

A bush bearing in accordance with the present invention for rotatably supporting a rotating shaft portion of an end portion of a driving gear which meshes via a meshing portion with a driven gear of a transmission for transmitting the power of an electric motor for steering assistance to a steering mechanism in an electric power steering, comprises: a bearing body having an inner peripheral surface which is brought into contact with a cylindrical outer peripheral surface of the rotating shaft portion so as to be rotatable; groove means provided on an outer peripheral surface of the bearing body so as to extend in a direction about an axis of the rotating shaft portion; and elastic ring means fitted on the groove means and having a pair of projecting portions partially projecting radially outward from the outer peripheral surface of the bearing body at least in a direction which is perpendicular to the axis of the rotating shaft portion and is toward and away from the meshing portion, the elastic ring means having a portion not projecting radially outward from the outer peripheral surface of the bearing body.

According to the bush bearing in accordance with the present invention, since the bearing body has an inner peripheral surface which is rotatably brought into contact with the cylindrical outer peripheral surface of the rotating shaft portion, it is possible to provide a bush bearing which is capable of disusing a ball bearing for supporting the rotating shaft portion of an end portion of the driving gear, and which is inexpensive and lightweight. Moreover, the elastic ring means, which is fitted in the groove means provided on the outer peripheral surface of the bearing body and compensates the meshing between the driving gear and the driven gear to prevent the occurrence of tooth meshing noise between the driving gear and the driven gear due to backlash, has a pair of projecting portions partially projecting radially outward from the outer peripheral surface of the bearing body in the direction which is perpendicular to the axis of the rotating shaft portion and is toward and away from the meshing portion. Furthermore, the elastic ring means has a portion not projecting radially outward from the outer peripheral surface of the bearing body between the pair of projecting portions in the direction about the axis of the rotating shaft portion. Therefore, the elastic deformation at the pair of projecting portions can be allowed to escape to the non-projecting portion. Hence, it is possible to provide a bush bearing in which the elastic ring means is difficult to undergo permanent set and is able to maintain its initial characteristics even in long-term use.

The groove means may have at least two grooves provided on the outer peripheral surface of the bearing body so as to extend in the direction about the axis of the rotating shaft portion. In this case, the elastic ring means may have an elastic ring member fitted in one of the two grooves and an elastic ring member fitted in another one of the two grooves. The elastic ring member fitted in the one groove may have one projecting portion partially projecting radially outward from the outer peripheral surface of the bearing body on a meshing portion side in the direction which is perpendicular to the axis of the rotating shaft portion and is toward and away from the meshing portion and a portion not projecting radially outward from the outer peripheral surface of the bearing body on an opposite side to the meshing portion side in the direction which is perpendicular to the axis of the rotating shaft portion and is toward and away from the meshing portion. Further, the elastic ring member fitted in the another groove may have another projecting portion partially projecting radially outward from the outer peripheral surface of the bearing body on the opposite side to the meshing portion side in the direction which is perpendicular to the axis of the rotating shaft portion and is toward and away from the meshing portion and a portion not projecting radially outward from the outer peripheral surface of the bearing body on the meshing portion side in the direction which is perpendicular to the axis of the rotating shaft portion and is toward and away from the meshing portion.

In a preferred example, the one of the two grooves is constituted by an annular groove having a center offset from the axis of the rotating shaft portion toward the meshing portion side in the direction which is perpendicular to the axis of the rotating shaft portion and is toward and away from the meshing portion, and the another one of the two grooves is constituted by an annular groove having a center offset from the axis of the rotating shaft portion toward the opposite side to the meshing portion side in the direction which is perpendicular to the axis of the rotating shaft portion and is toward and away from the meshing portion.

In another preferred example, the one of the two grooves is constituted by a deep groove disposed on the meshing portion side in the direction which is perpendicular to the axis of the rotating shaft portion and is toward and away from the meshing portion and a shallow groove disposed on the opposite side to the meshing portion side in the direction which is perpendicular to the axis of the rotating shaft portion and is toward and away from the meshing portion, and the another one of the two grooves is constituted by a shallow groove disposed on the meshing portion side in the direction which is perpendicular to the axis of the rotating shaft portion and is toward and away from the meshing portion and a deep groove disposed on the opposite side to the meshing portion side in the direction which is perpendicular to the axis of the rotating shaft portion and is toward and away from the meshing portion.

The groove means may include at least one groove constituted by a deep groove disposed on the meshing portion side in the direction which is perpendicular to the axis of the rotating shaft portion and is toward and away from the meshing portion and a shallow groove disposed on the opposite side to the meshing portion side in the direction which is perpendicular to the axis of the rotating shaft portion and is toward and away from the meshing portion. In this case, the elastic ring means may include an elastic ring member which is fitted in the groove and has the pair of projecting portions partially projecting radially outward from the outer peripheral surface of the bearing body in the direction which is perpendicular to the axis of the rotating shaft portion and is toward and away from the meshing portion and the portion disposed between the pair of projecting portions in the direction about the axis of the rotating shaft portion and not projecting radially outward from the outer peripheral surface of the bearing body.

The bearing body may include a bearing main body having at least one slit which is open at an axial one end face thereof and extends toward an axial other end face thereof. Such at least one slit may be closed at a side of the other end face of the bearing main body or alternatively extend to the other end face of the bearing main body and may be open at that other end face.

The bearing main body may have, in addition to the at least one slit, at least another slit which is open at the axial other end face and extends toward the axial one end face. Such at least another slit may also be closed at a side of the one end face or alternatively extend to the one end face and may be open at the one end face.

According to the bearing main body having any of the above-described slits, since it is possible to expect a reduction in diameter of the bearing main body and enlargement in diameter after the reduction in diameter, the elastic ring means is prevented from undergoing an excess compressive deformation. By virtue of this as well, it is possible to provide a bush bearing which is capable of avoiding the permanent set of the elastic ring means and maintaining its initial characteristics even in the long-term use. Particularly according to the bush bearing having at least one slit and another slit, such operation and effects can be caused to take place more reliably.

In a case where one of at least one slit and another slit is open at both end faces, the bearing main body is constituted by a plurality of split bodies. In such a bearing main body constituted by the plurality of split bodies, the reduction in diameter of the bearing main body can be caused to take place more easily, and the permanent set of the elastic ring means can be avoided more effectively.

The bearing body may include the bearing main body made of a synthetic resin and having a sliding inner peripheral surface which is brought into direct contact with the cylindrical outer peripheral surface of the rotating shaft portion, the groove means being provided on the outer peripheral surface of the bearing main body. Still alternatively, the bearing body may include the bearing main body made of a synthetic resin or aluminum and provided with the groove means on the outer peripheral surface thereof, and a bush member constituted by a multilayered sliding member which is fitted to the inner peripheral surface of the bearing main body and has a sliding inner peripheral surface which is rotatably brought into direct contact with the cylindrical outer peripheral surface of the rotating shaft portion.

In addition, a bush bearing in accordance with the present invention for rotatably supporting a rotating shaft portion of an end portion of a driving gear which meshes via a meshing portion with a driven gear of a transmission for transmitting the power of an electric motor for steering assistance to a steering mechanism in an electric power steering, comprises: a bearing body having an inner peripheral surface which is brought into contact with a cylindrical outer peripheral surface of the rotating shaft portion so as to be rotatable; groove means provided on an outer peripheral surface of the bearing body so as to extend in a direction about an axis of the rotating shaft portion; and elastic ring means fitted on the groove means and having a pair of projecting portions partially projecting radially outward from the outer peripheral surface of the bearing body at least in a direction which is perpendicular to the axis of the rotating shaft portion and is toward and away from the meshing portion, wherein one of the projecting portions partially projecting radially outward from the outer peripheral surface of the bearing body on a meshing portion side in the direction toward and away from the meshing portion has a smaller amount of projection than an amount of radially outward projection of another one of the projecting portions partially projecting radially outward from the outer peripheral surface of the bearing body on an opposite side to the meshing portion side in the direction toward and away from the meshing portion.

Such a bush bearing may further comprise another groove means and another elastic ring means. In this case, the bearing body may include an outer bearing main body made of a synthetic resin or aluminum and provided with the groove means on an outer peripheral surface thereof; an inner bearing main body made of a synthetic resin or aluminum, disposed on an inner peripheral surface of the outer bearing main body, and provided with the another groove means on an outer peripheral surface thereof; and a bush member constituted by a multilayered sliding member which is fitted to an inner peripheral surface of the inner bearing main body and has a sliding inner peripheral surface which is rotatably brought into direct contact with the cylindrical outer peripheral surface of the rotating shaft portion. Further, the another elastic ring means may partially project radially outward from the outer peripheral surface of the inner bearing main body in the direction which is perpendicular to the axis of the rotating shaft portion and is toward and away from the meshing portion, and the another elastic ring means may be in contact with the inner peripheral surface of the outer bearing main body and may be fitted in the another groove means.

Preferably, the synthetic resin-made bearing main body having the sliding inner peripheral surface which is rotatably brought into direct contact with the cylindrical outer peripheral surface of the rotating shaft portion may be formed of a synthetic resin exhibiting low friction characteristics, such as polyacetal resin and polyamide resin. The synthetic resin-made bearing main body as well as the outer bearing main body and the inner bearing main body which are used together with the bush member may be formed of a synthetic resin similar to those mentioned above. However, in a case where low friction characteristics are not particularly required, they may be formed of a fiber-reinforced thermoplastic synthetic resin.

The bush bearing in accordance with the present invention may be for use in an electric power steering system, wherein one rotating shaft may be adapted to be connected to an output rotating shaft of an electric motor, and another rotating shaft may be adapted to be connected to a steering shaft of an automobile, and wherein the driving gear is a worm shaft, and the driven gear is a worm wheel.

Advantages of the Invention

According to the present invention, it is possible to provide a bush bearing which is capable of maintaining its initial characteristics even in the long-term use and disusing the ball bearing, and which is inexpensive and lightweight.

Hereafter, a more detailed description will be given of the mode for carrying out the invention with reference to the preferred embodiments shown in the drawings. It should be noted that the present invention is not limited to these embodiments.

BEST MODE FOR CARRYING OUT THE INVENTION

Figure 1:
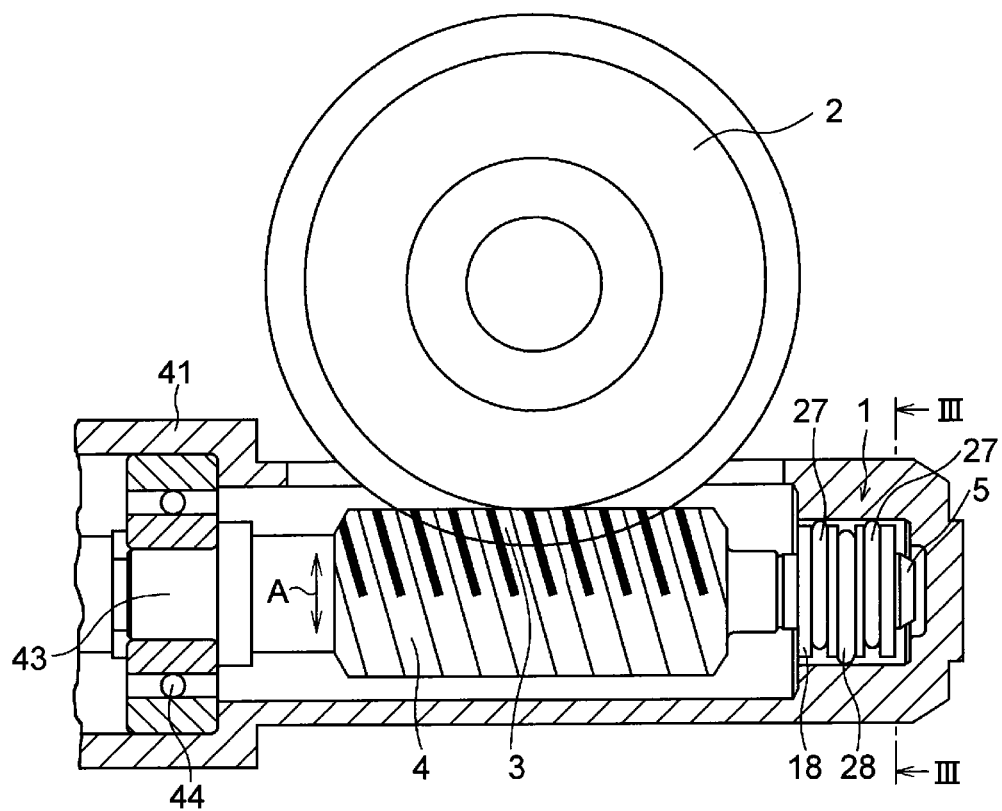
FIG. 1 is an explanatory front elevational view of a preferred embodiment of the invention.
Figure 2:
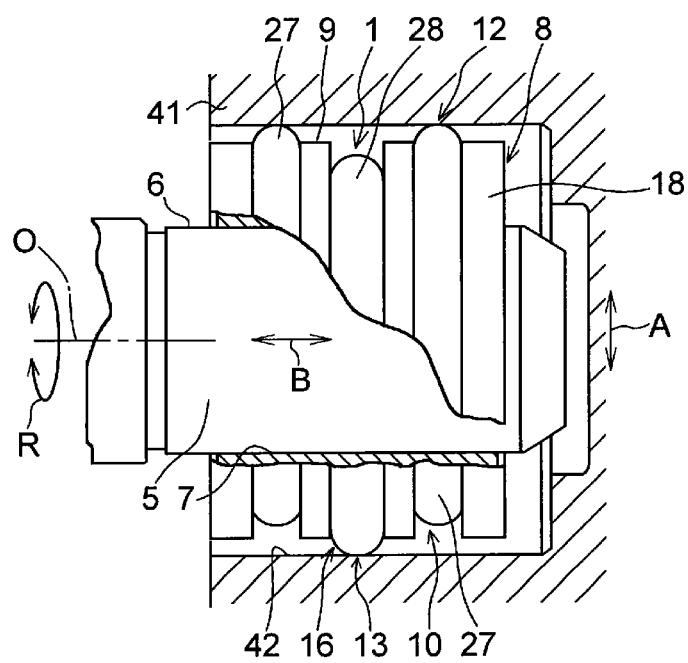
FIG. 2 is a partially enlarged view of the embodiment shown in FIG. 1.
Figure 3:
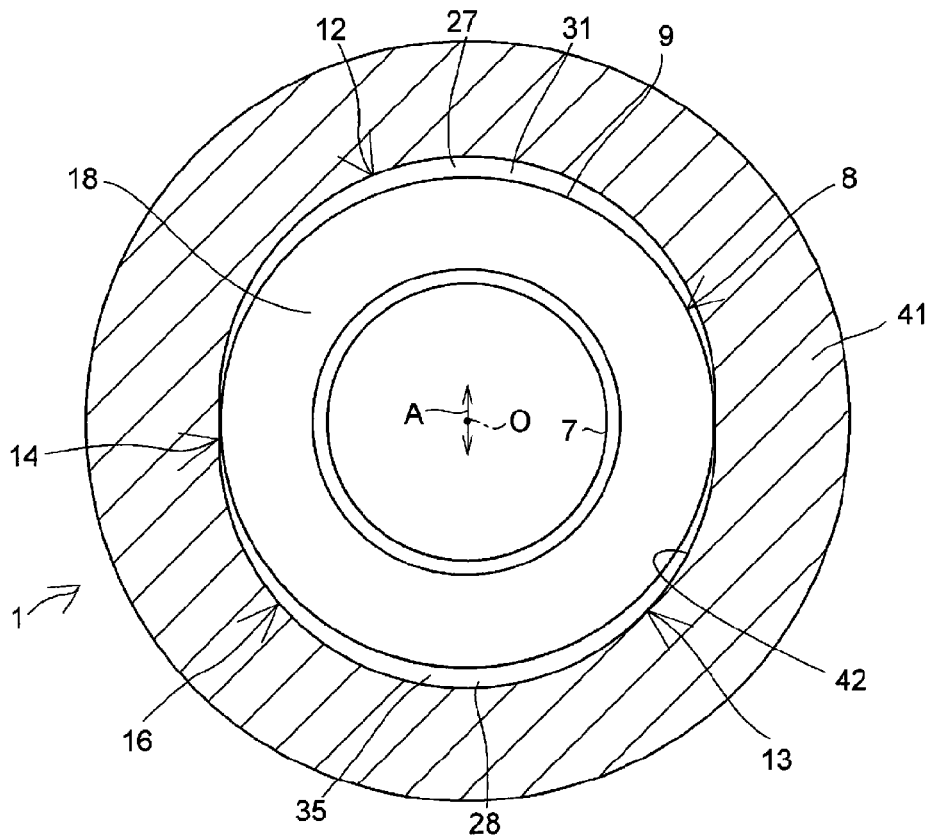
FIG. 3 is an explanatory cross-sectional view taken in the direction of arrows along line III-III shown in FIG. 1.
Figure 4:
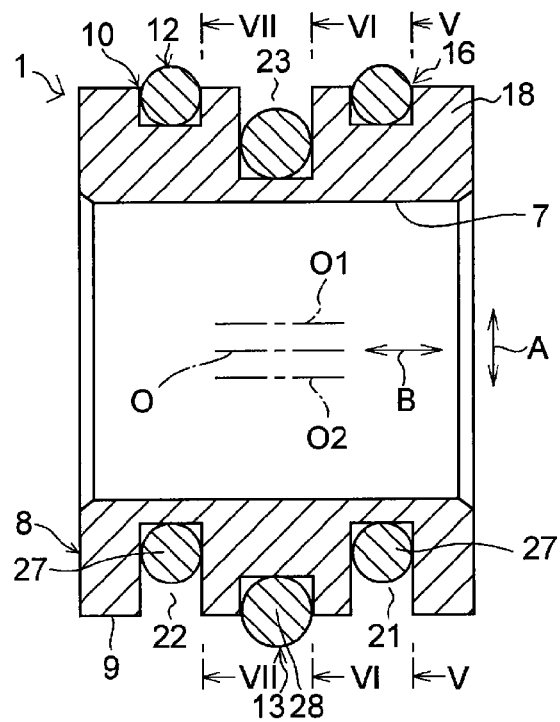
FIG. 4 is an explanatory cross-sectional view of the bush bearing shown in FIG. 1.
Figure 5:
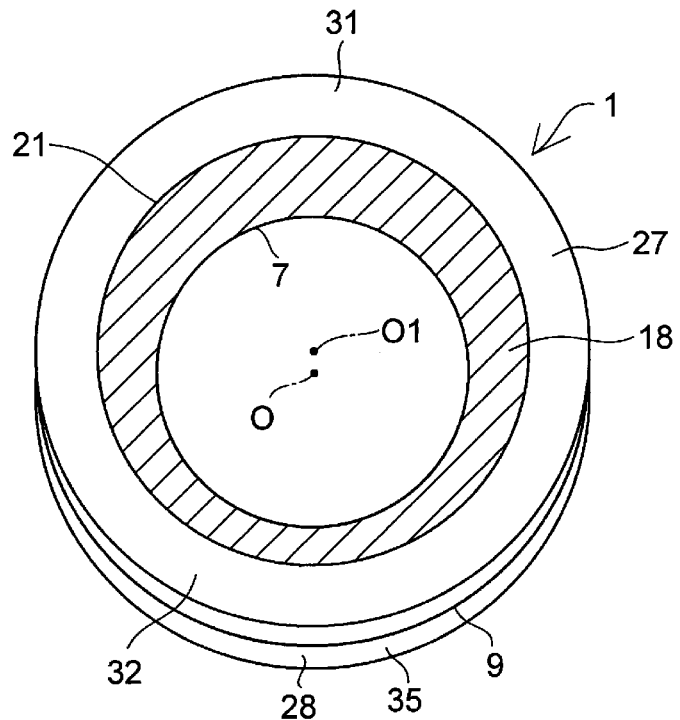
FIG. 5 is an explanatory cross-sectional view taken in the direction of arrows along line V-V shown in FIG. 4.
Figure 6:
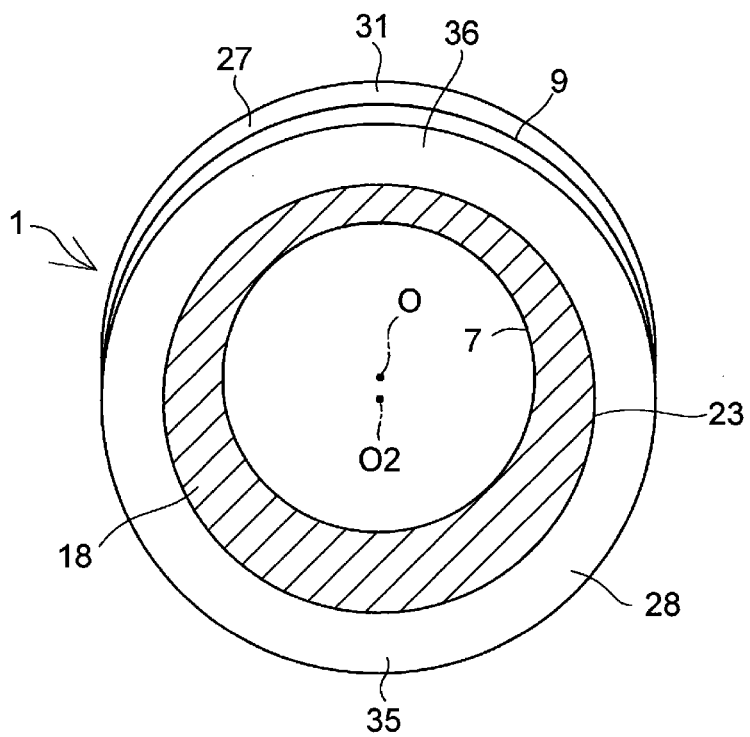
FIG. 6 is an explanatory cross-sectional view taken in the direction of arrows along line VI-VI shown in FIG. 4.
Figure 7:
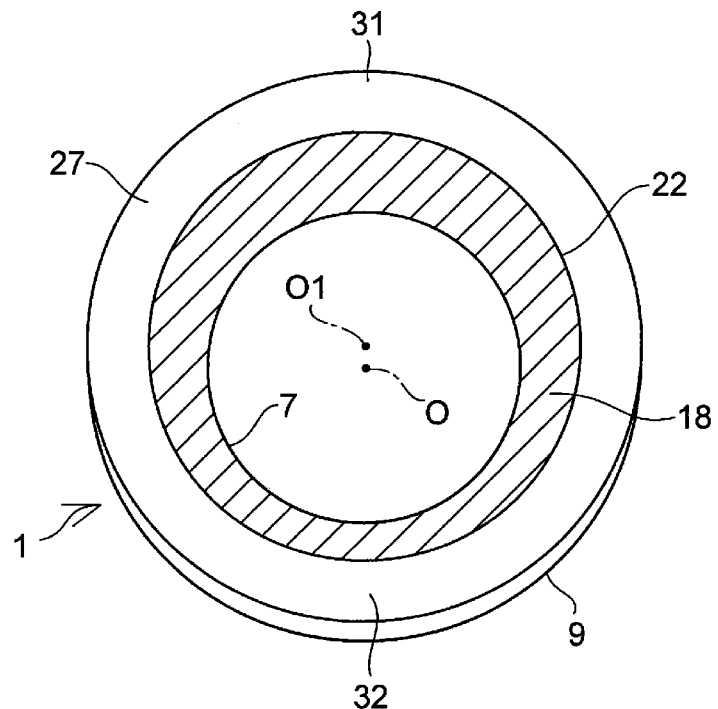
FIG. 7 is an explanatory cross-sectional view taken in the direction of arrows along line VII-VII shown in FIG. 4.

In FIGS. 1 to 7, a bush bearing 1 in accordance with this embodiment rotatably supports a rotating shaft portion 5 of an end portion of a worm gear serving as a driving gear which meshes via a meshing portion 3 with a worm wheel 2 serving as a driven gear of a transmission for transmitting the power of an electric motor for steering assistance to a steering mechanism in an electric power steering.

The bush bearing 1 includes a bearing body 8 having an inner peripheral surface 7 which is brought into contact with a cylindrical outer peripheral surface 6 of the rotating shaft portion 5 so as to be rotatable in a direction about an axis O (hereafter referred to as an R direction), groove means 10 provided on an outer peripheral surface 9 of the bearing body 8 so as to extend in the R direction, and elastic ring means 16 fitted on the groove means 10 and having a pair of projecting portions 12 and 13 and portion 14, the pair of projecting portions 12 and 13 partially projecting radially outward from the outer peripheral surface 9 of the bearing body 8 in a direction which is perpendicular to the axis O of the rotating shaft portion 5 and is a direction toward and away from the meshing portion (hereafter referred to as an A direction), the portion 14 being provided at positions in the R direction between the pair of projecting portions 12 and 13, and not projecting radially outward from the outer peripheral surface 9 of the bearing body 8.

The bearing body 8 has the cylindrical inner peripheral surface 7 serving as a sliding inner peripheral surface which is brought into direct contact with the cylindrical outer peripheral surface 6 of the rotating shaft portion 5 so as to be rotatable in the R direction and has the cylindrical outer peripheral surface 9 provided with the groove means 10. Further, the bearing body 8 is constituted by a bearing main body 18 made of a synthetic resin such as polyacetal resin, polyamide resin, or the like and formed integrally, and the inner peripheral surface 7 and the outer peripheral surface 9 which are cylindrical in shape have a center concentric with the axis O of the rotating shaft portion 5.

The groove means 10 has three annular grooves 21, 22, and 23 provided on the outer peripheral surface 9 of the bearing main body 18 in such a manner as to extend in the R direction. The grooves 21 and 22 are formed in a mutually similar manner with a center O1 which is off-centered from the axis O of the rotating shaft portion 5 toward the meshing portion 3 side in the A direction, while the groove 23 is disposed substantially in the center between the two grooves 21 and 22 in an axial direction B of the rotating shaft portion 5 (hereafter referred to as the B direction) and has a center O2 which is off-centered from the axis O of the rotating shaft portion 5 toward an opposite side to the meshing portion 3 side in the A direction, and is hence sandwiched by the two grooves 21 and 22 in the B direction.

The grooves 21 and 22 having the center O1 which is off-centered from the axis O of the rotating shaft portion 5 toward the meshing portion 3 side are respectively formed shallowly on that meshing portion 3 side, and are formed deeply on the opposite side to the meshing portion 3 side. Meanwhile, the groove 23 having the center O2 which is off-centered from the axis O of the rotating shaft portion 5 toward the opposite side to the meshing portion 3 side is formed shallowly on that opposite side to the meshing portion 3 side and is formed deeply on the meshing portion 3 side.

The elastic ring means 16 has elastic ring members 27 constituted by O-rings which are respectively fitted in the grooves 21 and 22 and an elastic ring member 28 constituted by an O-ring which is fitted in the groove 23.

Each of the elastic ring members 27 having the same diameter and respectively fitted in the grooves 21 and 22 has a projecting portion 31 which partially projects radially outward from the outer peripheral surface 9 of the bearing main body 18 on the meshing portion 3 side in the A direction, and has a portion 32 which does not project radially outward from the outer peripheral surface 9 of the bearing main body 18 on the opposite side to the meshing portion 3 side in the A direction. The projecting portion 31 has a central angle of 180° in the R direction, while the portion 32 has a central angle of the remaining 180° in the R direction.

The elastic ring member 28 fitted in the groove 23 has another projecting portion 35 which partially projects radially outward from the outer peripheral surface 9 of the bearing main body 18 on the opposite side to the meshing portion 3 side in the A direction, and has a portion 36 which does not project radially outward from the outer peripheral surface 9 of the bearing main body 18 on the meshing portion 3 side in the A direction. The projecting portion 35 has a central angle of 180° in the R direction, while the portion 36 has a central angle of the remaining 180° in the R direction.

Maximum amounts of projection of the projecting portions 31 and 35 from the outer peripheral surface 9 of the bearing main body 18 on the meshing portion 3 side and the side opposite to the meshing portion 3 side are identical to each other in this embodiment.

Thus, in this embodiment, the projecting portion 12 consists of the two projecting portions 31, the projecting portion 13 consists of the one projecting portion 35, and the non-projecting portion 14 consists of the portions 32 and the portion 36.

The above-described bush bearing 1 is fitted to an inner peripheral surface 42 having a substantially elliptical shape having a long axis in the A direction in one end portion of a housing 41 for accommodating the worm shaft 4 with interference based on the elastic deformation of the elastic ring members 27 and 28, and is adapted to support the rotating shaft portion 5 at the one end portion of the worm shaft 4 rotatably in the R direction as the outer peripheral surface 6 slides in the R direction with respect to the inner peripheral surface 7. Meanwhile, a rotating shaft portion 43 at the other end portion of the worm shaft 4 coupled to an output rotating shaft of an electric motor is supported rotatably in the R direction by a ball bearing 44 secured to the housing 41. It should be noted that, instead of disposing the bush bearing 1 on the inner peripheral surface 42 of the housing 41 having the above-described substantially elliptical shape, the bush bearing 1 may be disposed on the inner peripheral surface 42 of the housing 41 having a circular shape with the interference based on the elastic deformation of the elastic ring members 27 and 28, so as to prevent the rotation in the R direction of the bush bearing 1 by the frictional resistance between the inner peripheral surface 42 and the elastic ring members 27 and 28.

Since the worm shaft 4 whose rotating shaft portion 5 at the one end portion is supported by the bush bearing 1 rotatably in the R direction is supported by the one end portion of the housing 41 rotatably in the R direction by means of the elastic ring members 27 and 28 fitted to the inner peripheral surface 42 with the interference based on the elastic deformation, the meshing of the meshing portion 3 with the worm wheel 2 is elastically compensated, so that tooth meshing noise at the meshing portion 3 with the worm wheel 2 due to backlash does not occur.

Since the above-described bush bearing 1 has the non-projecting portion 14 of the elastic ring means 16 consisting of those portions 32 and 36 of the elastic ring members 27 and 28 which do not project radially outward from the outer peripheral surface 9 of the bearing main body 18, the elastic deformation at the projecting portions 31 and 35 of the elastic ring members 27 and 28 can be allowed to escape to the portion 14, specifically the portions 32 and 36. Hence, the elastic ring means 16 is difficult to undergo permanent set and is able to maintain its initial characteristics even in long-term use.

In the bush bearing 1 shown in FIGS. 1 to 7, the bearing body 8 is constituted by the bearing main body 18 itself having the inner peripheral surface 7 which is brought into direct contact with the outer peripheral surface 6 of the rotating shaft portion 5 rotatably in the R direction. Alternatively, however, as shown in FIGS. 8 to 10, the bearing body 8 may include the bearing main body 18 made of a synthetic resin or aluminum and provided with the groove means 10 on its outer peripheral surface 9, and a bush member 53 with a collar 52 constituted by a multilayered sliding member which is fitted to the inner peripheral surface 7 of the bearing main body 18 and has an inner peripheral surface 51 serving as a sliding inner peripheral surface which is brought into direct contact with the cylindrical outer peripheral surface 6 of the rotating shaft portion 5 rotatably in the R direction.

Figure 10:
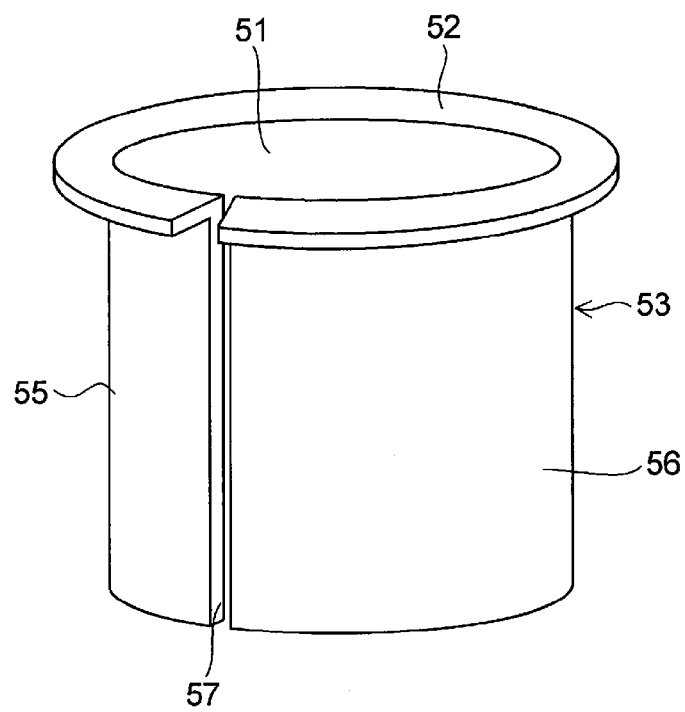
FIG. 10 is a perspective view of a bush member shown in FIG. 8.

The bush member 53 in accordance with this embodiment, which includes a tubular portion 56 having in addition to the cylindrical inner peripheral surface 51 a cylindrical outer peripheral surface 55 and the annular collar 52 formed integrally with the tubular portion 56, is constituted by a wrapped bush in which a multilayered sliding member, consisting of a steel plate, a porous sintered layer sintered on one surface of this steel plate, and a sliding layer formed of a synthetic resin including polytetrafluoroethylene and the like filled in pores of and coated on the surface of this porous sintered layer, is wound with the sliding layer placed on the inner side, and which has a butt gap 57 shown particularly in FIG. 10. The bush member 53 is fitted at its outer peripheral surface 55 to the inner peripheral surface 7 of the bearing main body 18, and is brought at its collar 52 into contact with one annular end face 58 of the bearing main body 18, so as to allow the rotating shaft portion 5 to be supported rotatably in the R direction by means of the inner peripheral surface 51 serving as the sliding inner peripheral surface.

Figure 8:
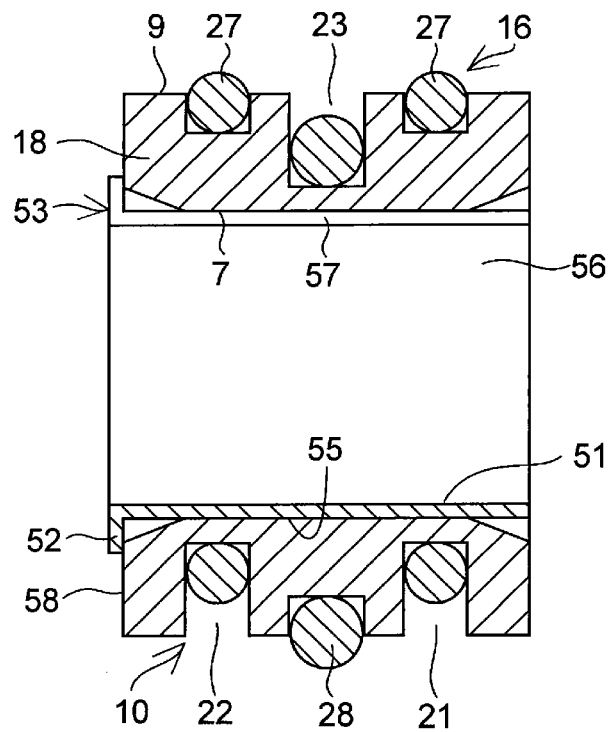
FIG. 8 is an explanatory cross-sectional view, taken in the direction of arrows along line VIII-VIII shown in FIG. 9, of another preferred embodiment of the invention.
Figure 9:
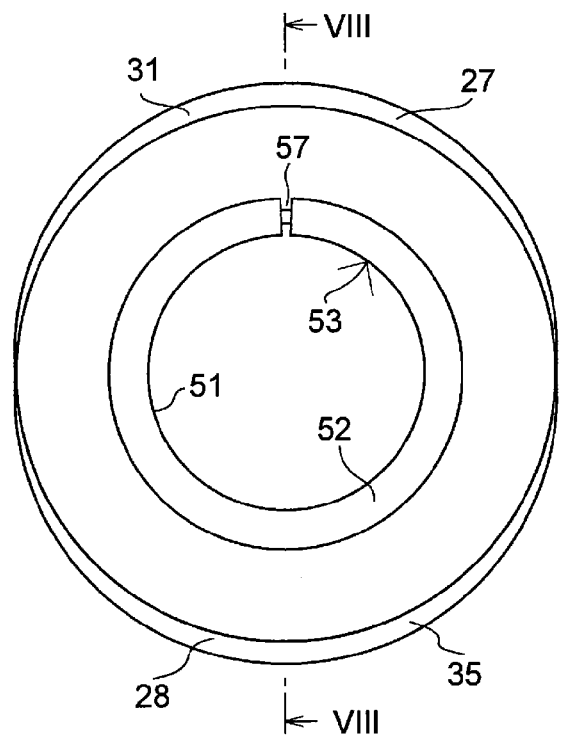
FIG. 9 is an explanatory left side view of the embodiment shown in FIG. 8.

Also with the bush bearing 1 shown in FIGS. 8 to 10, as a result of the fact that the elastic ring means 16 having the elastic ring members 27 and 28 is fitted in the groove means 10 having the grooves 21, 22, and 23, the elastic ring members 27 and 28 of the elastic ring means 16 have the portions 32 and 36 which do not project radially outward from the outer peripheral surface 9 of the bearing main body 18. Therefore, the elastic deformation at the projecting portions 31 and 35 of the elastic ring members 27 and 28 can be allowed to escape to the portion 14, i.e., the portions 32 and 36. Hence, the elastic ring means 16 is difficult to undergo permanent set and is able to maintain its initial characteristics even in long-term use, and the rotating shaft portion 5 can be supported rotatably in the R direction more smoothly by the bush member 53.

With either one of the above-described bush bearings 1, the bearing body 8 includes the bearing main body 18 having the inner peripheral surface 7 and the outer peripheral surface 9 which are respectively continuous in the R direction. In substitution thereof, as shown in FIGS. 11 to 13, the bearing body 8 may be constituted by the synthetic resin-made bearing main body 18 further including three slits 62 which are open at the one end face 58 in the B direction, extend from the end face 58 toward the other end face 61 in the B direction, and are closed at the other end face 61 side, as well as three slits 63 which are open at the other end face 61 in the B direction, extend from the end face 61 toward the one end face 58 in the B direction, and are closed at the one end face 58 side.

Figure 11:
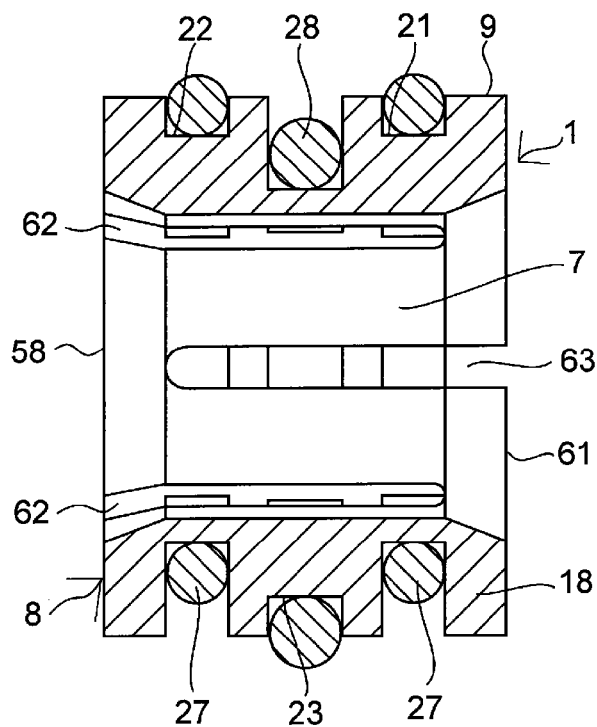
FIG. 11 is an explanatory cross-sectional view, taken in the direction of arrows along line XI-XI shown in FIG. 12, of still another preferred embodiment of the invention.
Figure 12:
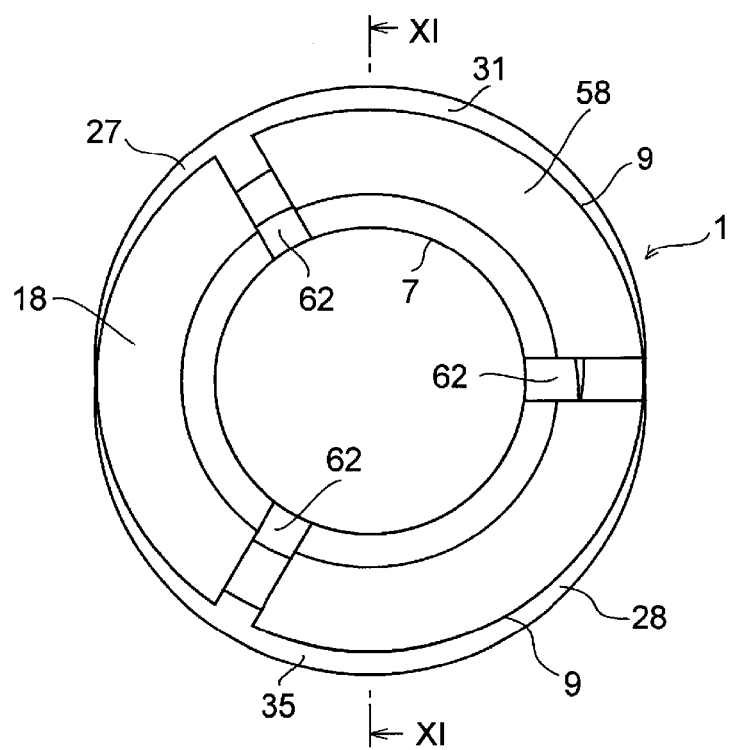
FIG. 12 is an explanatory left side view of the embodiment shown in FIG. 11.
Figure 13:
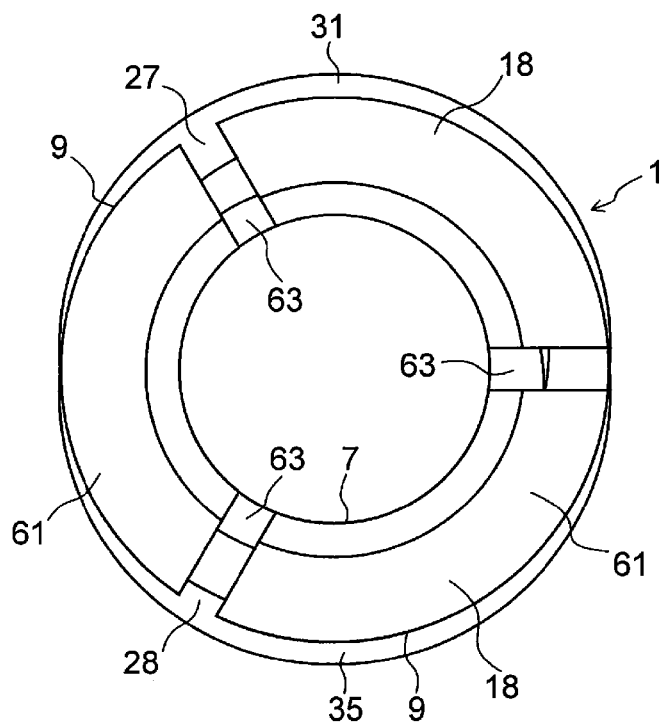
FIG. 13 is an explanatory right side view of the embodiment shown in FIG. 11.

In FIGS. 11 to 13, the three slits 62 severing the inner peripheral surface 7 and the outer peripheral surface 9 in the R direction and extending in the B direction are arranged with mutually equal central angles of 120° in the R direction. Meanwhile, the three slits 63 severing the inner peripheral surface 7 and the outer peripheral surface 9 in the R direction and extending in the B direction are arranged with mutually equal central angles of 120° in the R direction and each having a difference of 60° with respect to each of the three slits 62.

According to the bush bearing 1 shown in FIGS. 11 to 13, as a result of the fact that the bearing main body 18 is made elastically reducible in diameter by the slits 62 and 63, the elastic force of the elastic ring members 27 and 28 can be exerted on the rotating shaft portion 5 via the bearing main body 18, and the rotating shaft portion 5 can be supported rotatably in the R direction by the resilient force of the elastic ring members 27 and 28. Furthermore, the bush bearing 1 can be fitted to the inner peripheral surface 42 also with the interference based on the elastic deformation of the bearing main body 18 in addition to the interference of the elastic ring members 27 and 28. As a result, the elastic ring means 16 consisting of the elastic ring members 27 and 28 is difficult to undergo permanent set and is able to maintain its initial characteristics even in long-term use. Additionally, even if wear occurs in the outer peripheral surface 6 of the rotating shaft portion 5 and/or the inner peripheral surface 7, the wear can be compensated by the elastic deformation of the bearing main body 18.

Figure 14:
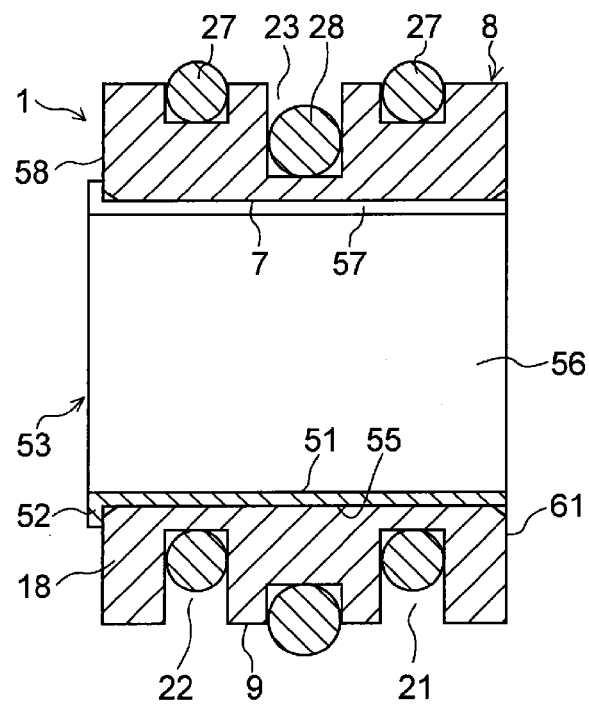
FIG. 14 is an explanatory cross-sectional view, taken in the direction of arrows along line XIV-XIV shown in FIG. 15, of a further preferred embodiment of the invention.
Figure 15:
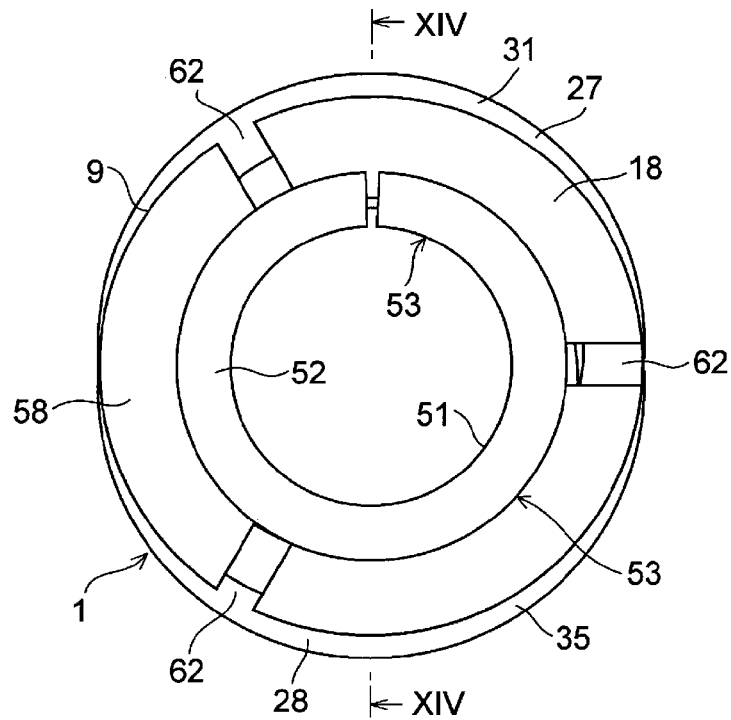
FIG. 15 is an explanatory left side view of the embodiment shown in FIG. 14.
Figure 16:
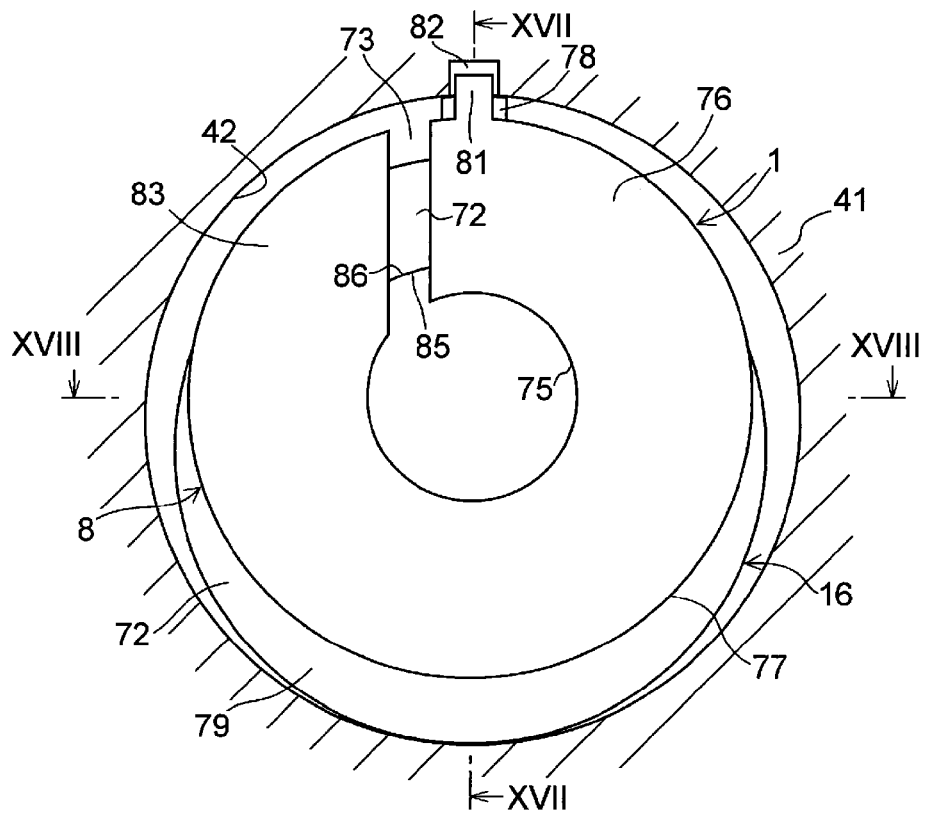
FIG. 16 is an explanatory left side view of a still further embodiment of the invention.
Figure 17:
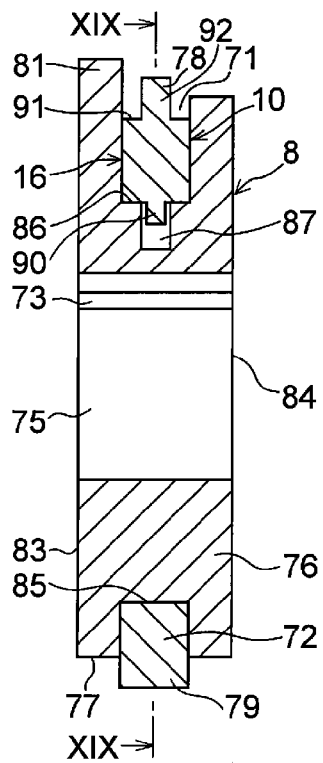
FIG. 17 is an explanatory cross-sectional view taken in the direction of arrows along line XVII-XVII shown in FIG. 16.
Figure 18:
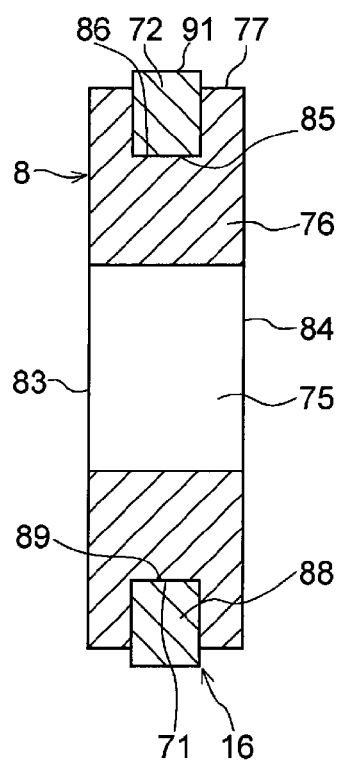
FIG. 18 is an explanatory cross-sectional view taken in the direction of arrows along line XVIII-XVIII shown in FIG. 16.
Figure 19:
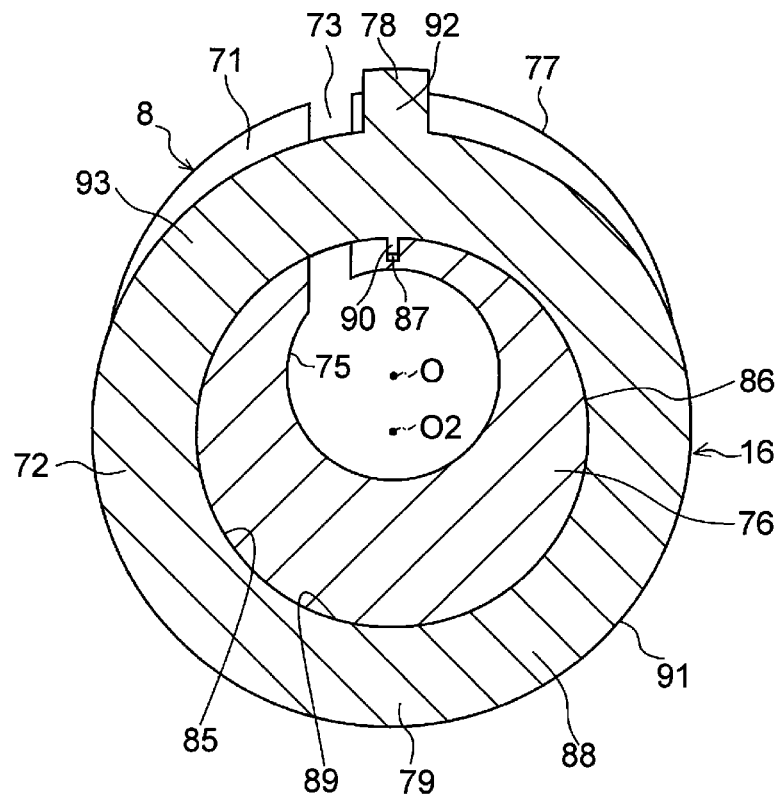
FIG. 19 is an explanatory cross-sectional view taken in the direction of arrows along line XIX-XIX shown in FIG. 17.
Figure 20:
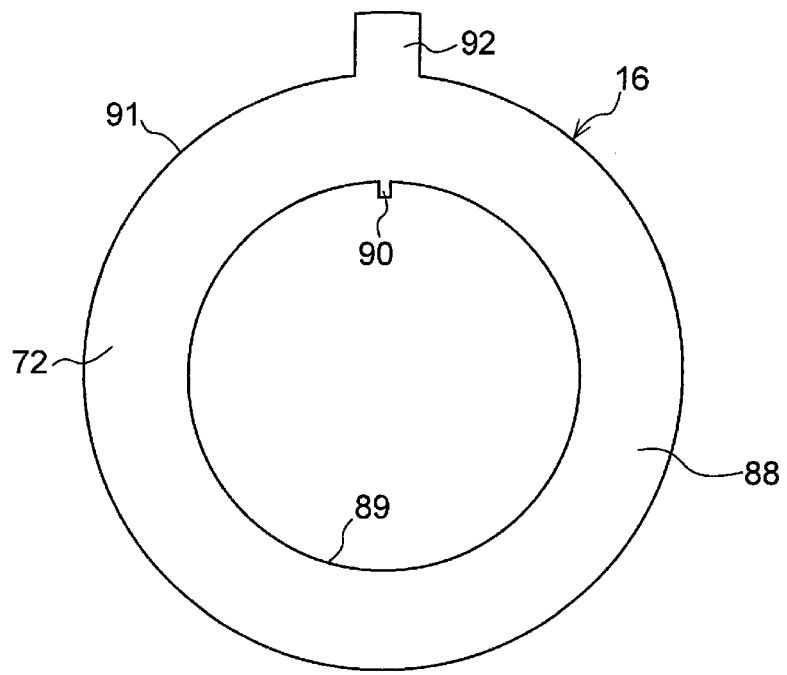
FIG. 20 is an explanatory diagram of an elastic ring means shown in FIG. 16.

It is possible to adopt the bush bearing 1 shown in FIGS. 14 and 15 by using the bush member 53 with the collar 52 shown in FIG. 10 for the bush bearing 1 shown in FIGS. 11 to 13. In the bush bearing 1 shown in FIGS. 14 and 15, the bearing body 8 includes the bearing main body 18 made of a synthetic resin or aluminum and the bush member 53 with the collar 52. The bearing main body 18 includes the three slits 62 which are open at the one end face 58 in the B direction, extend from the end face 58 toward the other end face 61 in the B direction, and are closed at the other end face 61 side, as well as the three slits 63 which are open at the other end face 61 in the B direction, extend from the end face 61 toward the one end face 58 in the B direction, and are closed at the one end face 58 side (see FIG. 13). The bush member 53 is constituted by a multilayered sliding member which is fitted to the inner peripheral surface 7 of the bearing main body 18 and has the inner peripheral surface 51 serving as the sliding inner peripheral surface which is brought into direct contact with the cylindrical outer peripheral surface 6 of the rotating shaft portion 5 rotatably in the R direction.

According to the bush bearing 1 shown in FIGS. 14 and 15, the elastic deformation at the projecting portions 31 and 35 of the elastic ring members 27 and 28 can be allowed to escape to the portions 32 and 36. Hence, the elastic ring means 16 is difficult to undergo permanent set and is able to maintain its initial characteristics even in long-term use, and the rotating shaft portion 5 can be supported rotatably in the R direction more smoothly by the bush member 53. Furthermore, since the elasticity based on the elastic ring members 27 and 28 can be exerted on the bush member 53 via the bearing main body 18, even if wear occurs in the outer peripheral surface 6 of the rotating shaft portion 5 and/or the inner peripheral surface 51, the wear can be compensated by the reduction in diameter of the bush member 53.

In the above, the numbers of the slits 62 and 63 are not limited to three and suffice if they are one or more. Instead of extending straightly in the B direction, the slits 62 and 63 may extend diagonally. Further, the slits 62 may extend up to the end face 61 and may be open at the end face 61, and the slits 63 may also extend up to the end face 58 and may be open at the end face 58.

In the above-described bush bearings 1, two elastic ring members 27 and one elastic ring member 28 are used, and these elastic ring members 27 and 28 are respectively fitted in the grooves 21, 22, and 23. In the embodiment of FIGS. 1 to 7, the outer peripheral surface 6 of the rotating shaft portion 5 is brought into direct contact with the inner peripheral surface 7 of the bearing main body 18 rotatably in the R direction. In the embodiment of FIGS. 8 to 10, the tubular portion 56 of the bush member 53 is fitted to the inner peripheral surface 7 of the bearing main body 18, and the outer peripheral surface 6 of the rotating shaft portion 5 is brought into direct contact with the inner peripheral surface 51 serving as the sliding inner peripheral surface of the tubular portion 56, so as to be rotatable in the R direction. In the embodiment of FIGS. 11 to 13, by using the synthetic resin-made bearing main body 18 having the slits 62 and 63 in the embodiment of FIGS. 1 to 7, the outer peripheral surface 6 of the rotating shaft portion 5 is brought into direct contact with the inner peripheral surface 7 of the bearing main body 18 rotatably in the R direction. In the embodiment of FIGS. 14 and 15, by using the bush member 53 in the embodiment of FIGS. 11 to 13, the outer peripheral surface 6 of the rotating shaft portion 5 is brought into direct contact with the inner peripheral surface 51 serving as the sliding inner peripheral surface of the tubular portion 56, so as to be rotatable in the R direction. However, as shown in FIGS. 16 to 20, the bush bearing 1 may be one which includes the groove means 10 having one annular groove 71 provided on an outer peripheral surface 77 of the bearing body 8 in such a manner as to extend in the R direction; the elastic ring means 16 having an elastic ring member 72 fitted in the annular groove 71; and the bearing body 8 consisting of a synthetic resin-made bearing main body 76 having one slit 73.

The bush bearing 1 shown in FIGS. 16 to 20 includes the bearing body 8 consisting of the synthetic resin-made bearing main body 76 having a cylindrical inner peripheral surface 75 serving as the sliding inner peripheral surface which is brought into direct contact with the outer peripheral surface 6 of the rotating shaft portion 5 rotatably in the R direction, the bearing main body 76 also having the slit 73 and the cylindrical outer peripheral surface 77; the groove means 10 having the annular groove 71 provided on the cylindrical outer peripheral surface 77 of the bearing main body 76 so as to extend in the R direction; and the elastic ring means 16 consisting of the elastic ring member 72 fitted in the annular groove 71 of the groove means 10 and having a pair of projecting portions 78 and 79 partially projecting radially outward from the outer peripheral surface 77 of the bearing main body 76 in the A direction.

The bearing body 8 has, in addition to the bearing main body 76, a projection 81 formed integrally with the bearing main body 76 and integrally projecting radially outward from the outer peripheral surface 77. The projection 81 is adapted to be fitted in a recess 82 formed in the inner peripheral surface 42 of the housing 41, so as to be movable in the radial direction. By virtue of such fitting of the projection 81 in the recess 82, the bearing main body 76 is adapted to be prevented from rotating in the R direction with respect to the housing 41.

The slit 73, which extends in the B direction in the bearing main body 76 and severs each of the inner peripheral surface 75, the outer peripheral surface 77, and the annular groove 71 in the R direction, is open at one end face 83 in the B direction of the bearing main body 76, extends from the end face 83 toward the other end face 84 in the B direction, is also open at that end face 84, and extends parallel to the A direction and is open at the inner peripheral surface 75 and the outer peripheral surface 77.

The annular groove 71 having a quadrangular cross section is formed in the bearing main body 76 with the center O2 which is off-centered from the axis O of the rotating shaft portion 5 toward the opposite side to the meshing portion 3 side in the A direction, the axis O being also the center of the inner peripheral surface 75. A recess 87 is formed in an annular bottom wall surface 86 of the bearing main body 76 which defines an annular bottom surface 85 of the annular groove 71.

The elastic ring member 72 includes an annular body 88 having a quadrangular cross section and fitted in the annular groove 71; an inner projection 90 formed integrally on an annular inner peripheral surface 89 of the annular body 88 in contact with the annular bottom wall surface 86 and fitted in the recess 87 movably in the radial direction; and a projection 92 formed integrally on the annular outer peripheral surface 91 of the annular body 88 concentric with the inner peripheral surface 89 having the center O2. As the inner projection 90 is fitted in the recess 87, the elastic ring member 72 is adapted to be prevented from rotating in the R direction with respect to the bearing main body 76. In such an elastic ring member 72, an apex of the projection 92 projecting radially outward from the outer peripheral surface 77 of the bearing main body 76 is formed as the projection portion 78. Hence, the elastic ring member 72 having the annular body 88 with the center O2 eccentric with the axis O has a portion 93 which does not project radially outward from the outer peripheral surface 77 of the bearing main body 76.

The bush bearing 1 shown in FIGS. 16 to 20 is fitted to the inner peripheral surface 42 of the housing 41 with interference based on the elastic deformation of the projecting portions 78 and 79 of the elastic ring member 72 coming into contact with the circular inner peripheral surface 42 of the housing 41, and is adapted to support the rotating shaft portion 5 rotatably in the R direction as the outer peripheral surface 6 slides in the R direction with respect to the inner peripheral surface 75. Since the worm shaft 4 whose rotating shaft portion 5 is supported by such a bush bearing 1 rotatably in the R direction is supported by the one end portion of the housing 41 rotatably in the R direction by means of the elastic ring member 72 fitted to the inner peripheral surface 42 with the interference based on the elastic deformation of the projecting portions 78 and 79, the meshing of the meshing portion 3 with the worm wheel 2 is elastically compensated, so that tooth meshing noise at the meshing portion 3 with the worm wheel 2 due to backlash does not occur. Furthermore, since the elastic ring member 72 has the portion 93 which does not project radially outward from the outer peripheral surface 77 of the bearing main body 76, the elastic deformation at the projecting portions 78 and 79 of the elastic ring member 72 can be allowed to escape to the portion 93. Hence, the elastic ring means 16 is difficult to undergo permanent set and is able to maintain its initial characteristics even in long-term use. Moreover, even if wear occurs in the outer peripheral surface 6 of the rotating shaft portion 5 and/or the inner peripheral surface 75, the wear can be compensated by the reduction in diameter of the bearing main body 76.

Figure 21:
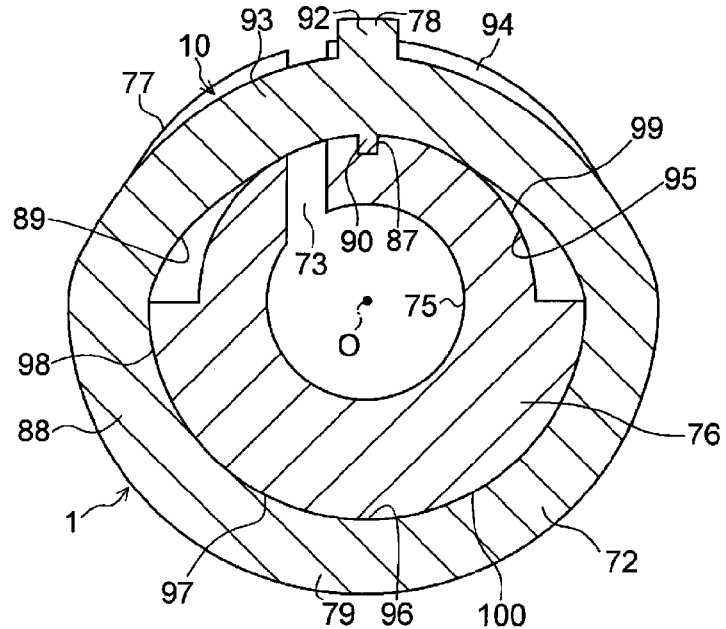
FIG. 21 is an explanatory cross-sectional view of a further embodiment of the invention.
Figure 22:
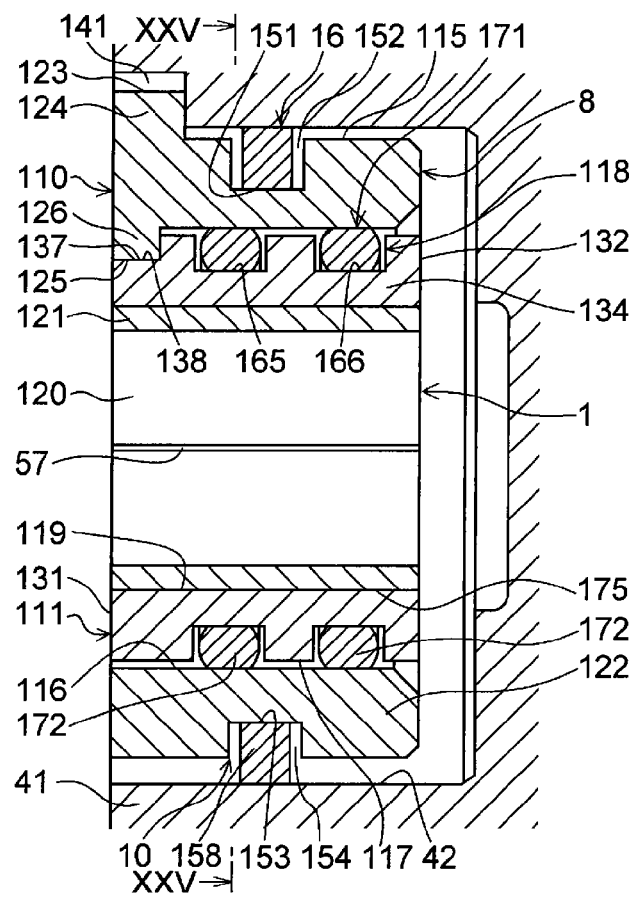
FIG. 22 is an explanatory cross-sectional view, taken in the direction of arrows along line XXII-XXII shown in FIG. 23, of a further embodiment of the invention.
Figure 23:
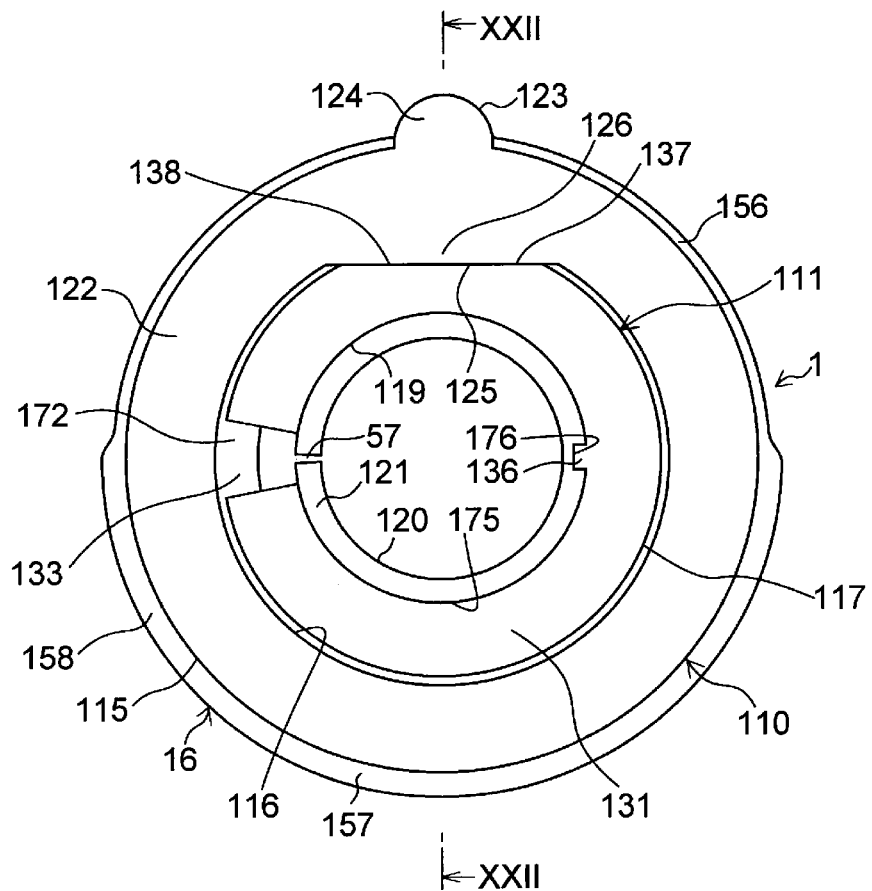
FIG. 23 is an explanatory left side view of the embodiment shown in FIG. 22.
Figure 24:
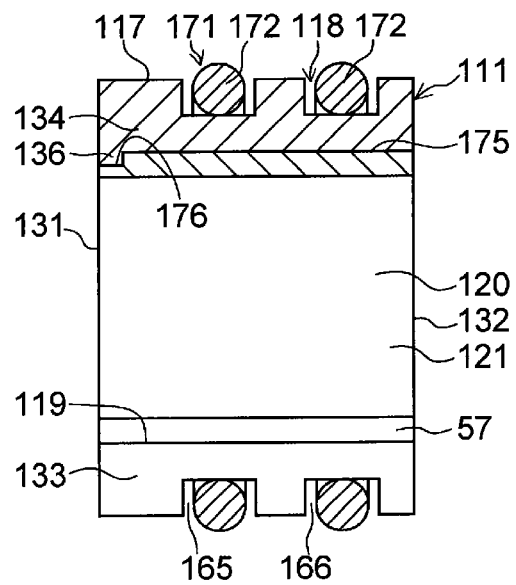
FIG. 24 is an explanatory partial view of the embodiment shown in FIG. 22.
Figure 25:
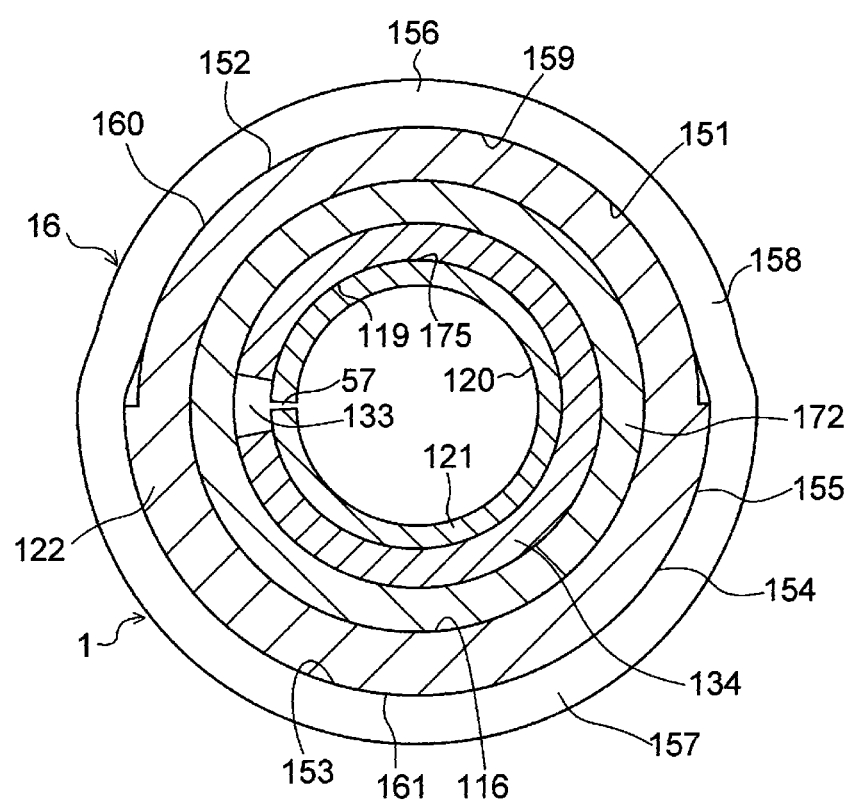
FIG. 25 is an explanatory cross-sectional view taken in the direction of arrows along line XXV-XXV shown in FIG. 22.

In the bush bearing 1 shown in FIGS. 16 to 20, the groove means 10 is constituted by the annular groove 71 having the annular bottom surface 85 with the center O2 eccentric with the axis O of the rotating shaft portion 5 and having the same depth in the R direction. In substitution thereof, it is possible to adopt the groove means 10 such as the one shown in FIG. 21. The groove means 10 shown in FIG. 21 is constituted by a stepped groove 98 consisting of a deep groove 94 which has a small-diameter semiannular bottom surface 95 concentric with the axis O of the rotating shaft portion 5, and is disposed on the meshing portion 3 side in the A direction, as well as a shallow groove 97 which has a semiannular bottom surface 96 being also concentric with the axis O of the rotating shaft portion 5 and with a diameter larger than that of the semiannular bottom surface 95, and is disposed on the opposite side to the meshing portion 3 side in the A direction. In this case, the elastic ring member 72 is disposed in a deformed manner in the stepped groove 98 such that its inner peripheral surface 89, on one hand, is in a state of being in partial contact with a semiannular bottom wall surface 99 of the bearing main body 76 defining the semiannular bottom surface 95, and, on the other hand, is in a state of being in total contact with a semiannular bottom wall surface 100 of the bearing main body 76 defining the semiannular bottom surface 96. At the same time, the elastic ring member 72 has the pair of projecting portions 78 and 79 partially projecting radially outward from the outer peripheral surface 77 of the bearing main body 76 in the A direction and the portion 93 not projecting radially outward from the outer peripheral surface 77 of the bearing main body 76, and is disposed in the stepped groove 98.

Also with the bush bearing 1 having the groove means 10 shown in FIG. 21, in the same way as the bush bearing 1 shown in FIGS. 16 to 20, since the worm shaft 4 is supported by the one end portion of the housing 41 rotatably in the R direction by means of the elastic ring member 72 fitted to the inner peripheral surface 42 with the interference based on the elastic deformation of the projecting portions 78 and 79, the meshing of the meshing portion 3 with the worm wheel 2 is elastically compensated, so that tooth meshing noise at the meshing portion 3 with the worm wheel 2 due to backlash does not occur. Furthermore, since the elastic ring member 72 has the portion 93 which does not project radially outward from the outer peripheral surface 77 of the bearing main body 76, the elastic deformation at the projecting portions 78 and 79 of the elastic ring member 72 can be allowed to escape to the portion 93. Hence, the elastic ring means 16 is difficult to undergo permanent set and is able to maintain its initial characteristics even in long-term use. Moreover, even if wear occurs in the outer peripheral surface 6 of the rotating shaft portion 5 and/or the inner peripheral surface 75, the wear can be compensated by the reduction in diameter of the bearing main body 76.

The groove means 10 shown in FIG. 21 is constituted by the stepped groove 98 having the deep groove 94 and the shallow groove 97. In substitution thereof, however, the groove means 10 may be constituted by a stepless groove 98 in which the deep groove 94 is made gradually shallower toward the shallow groove 97, while the shallow groove 97 is made gradually deeper toward the deep groove 94, such that the bottom surface 95 and the semiannular bottom wall surface 99, on the one hand, and the bottom surface 96 and the semiannular bottom wall surface 100, on the other hand, are made continuously connected in a stepless manner.

Each of the above-described bush bearings 1 is comprised of the bearing body 8 having one bearing main body 18 or 76. In substitution thereof, however, as shown in FIGS. 22 to 25, the bush bearing 1 may be comprised of the bearing body 8 having an outer bearing main body 110 and an inner bearing main body 111. In the bush bearing 1 shown in FIGS. 22 to 25, the bearing body 8 includes the outer bearing main body 110 made of a synthetic resin or aluminum and provided with the groove means 10 on its cylindrical outer peripheral surface 115; the inner bearing main body 111 made of a synthetic resin or aluminum, disposed on a cylindrical inner peripheral surface 116 of the outer bearing main body 110, and provided with another groove means 118 on its cylindrical outer peripheral surface 117; and a bush member 121 constituted by a multilayered sliding member which is fitted to a cylindrical inner peripheral surface 119 of the inner bearing main body 111 and has an inner peripheral surface 120 serving as a sliding inner peripheral surface which is brought into direct contact with the outer peripheral surface 6 of the rotating shaft portion 5 rotatably in the R direction.

The outer bearing main body 110 includes an annular portion 122 having the cylindrical outer peripheral surface 115 and inner peripheral surface 116, a projecting portion 124 formed integrally on the outer peripheral surface 115 of the annular portion 122 and having a semicylindrical outer peripheral surface 123, and a projecting portion 126 formed integrally on the inner peripheral surface 116 of the annular portion 122 and having a flat retaining surface 125. The inner bearing main body 111 includes an annular portion 134 which has a slit 133 which is open at one end face 131 in the B direction and extends from the end face 131 toward the other end face 132 in the B direction, and which is also open at that end face 132, the annular portion 134 having the cylindrical outer peripheral surface 117 and the inner peripheral surface 119; a projecting portion 136 formed integrally on the cylindrical inner peripheral surface 119 of the annular portion 134 severed in the R direction by the slit 133; and a notch 138 which is formed in the cylindrical outer peripheral surface 117 of the annular portion 134 severed in the R direction by the slit 133 and has a flat engaging surface 137. The projecting portion 124 is adapted to be fitted radially movably in a recess 141 formed in the inner peripheral surface 42 of the housing 41. As the projecting portion 124 is thus fitted in the recess 141, the outer bearing main body 110 is adapted to be prevented from rotating in the R direction with respect to the housing 41. The projecting portion 126 is engaged with the notch 138 such that the retaining surface 125 is brought into contact with the engaging surface 137 in such a manner as to be capable of moving away therefrom in the radial direction. As the projecting portion 126 is thus engaged with the notch 138, the inner bearing main body 111 is adapted to be prevented from rotating in the R direction with respect to the outer bearing main body 110.

In the bush bearing 1 shown in FIGS. 22 to 25, the groove means 10 is formed substantially in the same way as the groove means 10 shown in FIG. 21, and is constituted by a stepped groove 155 consisting of a deep groove 152 which has a small-diameter semiannular bottom surface 151 concentric with the axis O of the rotating shaft portion 5, and is disposed on the meshing portion 3 side in the A direction, as well as a shallow groove 154 which has a semiannular bottom surface 153 being also concentric with the axis O of the rotating shaft portion 5 and with a diameter larger than that of the semiannular bottom surface 151, and is disposed on the opposite side to the meshing portion 3 side in the A direction.

The elastic ring means 16 fitted in such a stepped groove 155 is constituted by an elastic ring member 158 with a quadrangular cross section having a pair of projecting portions 156 and 157 projecting radially outward from the outer peripheral surface 115 of the annular portion 122 of the outer bearing main body 110 in the A direction. The elastic ring member 158 is deformed such that its inner peripheral surface 159, on one hand, is in a state of being in substantially total contact with a semiannular bottom wall surface 160 of the annular portion 122 defining the semiannular bottom surface 151, and, on the other hand, is in a state of being in total contact with a semiannular bottom wall surface 161 of the annular portion 122 defining the semiannular bottom surface 153. Furthermore, the elastic ring member 158 is disposed in the stepped groove 155 such that the amount of radially outward projection of the projecting portion 156 from the outer peripheral surface 115 becomes smaller than the amount of radially outward projection of the projecting portion 157 from the outer peripheral surface 115.

The other grooves means 118 includes two annular grooves 165 and 166 which are provided by being arranged in the B direction on the outer peripheral surface 117 of the annular portion 134 of the inner bearing main body 111 in such a manner as to extend in the R direction. Each of the grooves 165 and 166 has a center concentric with the axis O of the rotating shaft portion 5, and such grooves 165 and 166 are also severed in the R direction by the slit 133 in the same way as the inner peripheral surface 119 and the outer peripheral surface 117.

The bush bearing 1 shown in FIGS. 22 to 25 and having the other groove means 118 has another elastic ring means 171 fitted in that groove means 118. The elastic ring means 171 has elastic ring members 172 constituted by O-rings which are respectively fitted in the grooves 165 and 166. Each of the elastic ring members 172 partially projects radially outward from the outer peripheral surface 117 of the annular portion 134 of the inner bearing main body 111, and is at its outer peripheral surface in elastic contact with the inner peripheral surface 116 of the annular portion 122 of the outer bearing main body 110 with interference.

In the bush bearing 1 shown in FIGS. 22 to 25, the bush member 121 has, in addition to the inner peripheral surface 120 serving as the cylindrical sliding inner peripheral surface, a cylindrical outer peripheral surface 175 and has in that outer peripheral surface 175 a recess 176 in which the projecting portion 136 is fitted. This bush member 121 is constituted by a wrapped bush having the butt gap 57 and formed substantially in the same way as the bush member 53 not having the collar 52, and is adapted to be prevented from rotating in the R direction with respect to the inner bearing main body 111 by the fitting of the projecting portion 136 into the recess 176.

With the above-described bush bearing 1 shown in FIGS. 22 to 25, the worm shaft 4 is supported by the one end portion of the housing 41 rotatably in the R direction by means of the elastic ring member 158 disposed on the circular inner peripheral surface 42 with the interference based on the elastic deformation of the projecting portions 156 and 157 and the elastic ring member 172 which is in elastic contact with the inner peripheral surface 116 of the annular portion 122 of the outer bearing main body 110 with interference. Therefore, the meshing of the meshing portion 3 with the worm wheel 2 is elastically compensated, so that tooth meshing noise at the meshing portion 3 with the worm wheel 2 due to backlash does not occur. Furthermore, the reduction in diameter of the annular portion 134 and the bush member 121 by the elastic ring member 172 makes it possible to ensure that the play due to the wear of the outer peripheral surface 6 of the rotating shaft portion 5 and/or the inner peripheral surface 120 of the bush member 121 does not occur.

The invention claimed is:

1. A bush bearing for rotatably supporting a rotating shaft portion of an end portion of a driving gear which meshes via a meshing portion with a driven gear of a transmission for transmitting the power of an electric motor for steering assistance to a steering mechanism in an electric power steering, comprising:
a bearing body having an inner peripheral surface which is brought into contact with a cylindrical outer peripheral surface of said rotating shaft portion so as to be rotatable; a groove provided on an outer peripheral surface of said bearing body so as to extend in a direction about an axis of said rotating shaft portion; and an elastic ring fitted on said groove and having a pair of projecting portions partially projecting radially outward from the outer peripheral surface of said bearing body at least in a direction which is perpendicular to the axis of said rotating shaft portion and is toward and away from the meshing portion, wherein one of said projecting portions partially projecting radially outward from the outer peripheral surface of said bearing body on a meshing portion side in the direction toward and away from the meshing portion has a smaller amount of projection than an amount of radially outward projection of another one of said projecting portions partially projecting radially outward from the outer peripheral surface of said bearing body on an opposite side to the meshing portion side in the direction toward and away from the meshing portion, and said bush bearing further comprising: another groove and another elastic ring, wherein said bearing body includes an outer bearing main body made of a synthetic resin or aluminum and provided with said groove on the outer peripheral surface of said outer bearing main body; an inner bearing main body made of a synthetic resin or aluminum, disposed on an inner peripheral surface of said outer bearing main body, and provided with said another groove on an outer peripheral surface thereof; and a bush member constituted by a multilayered sliding member which is fitted to an inner peripheral surface of said inner bearing main body and the bush member having a sliding inner peripheral surface which is rotatably brought into direct contact with the cylindrical outer peripheral surface of said rotating shaft portion, and wherein said another elastic ring partially projects radially outward from the outer peripheral surface of said inner bearing main body in the direction which is perpendicular to the axis of said rotating shaft portion and is toward and away from the meshing portion, said another elastic ring being in contact with the inner peripheral surface of said outer bearing main body and fitted in said another groove.

* * * * *